UNITED STATES PATENT OFFICE.

ALFRED HOFFMAN, OF BROOKLYN, AND ALFRED H. KROPFF, OF KEW GARDENS, NEW YORK.

CALCIUM HYPOCHLORITE AND PROCESS FOR MAKING SAME.

1,288,587. Specification of Letters Patent. Patented Dec. 24, 1918.

No Drawing. Application filed June 20, 1918. Serial No. 241,015.

*To all whom it may concern:*

Be it known that we, ALFRED HOFFMAN and ALFRED H. KROPFF, both citizens of the United States, and residents, respectively, of Brooklyn, in the county of Kings and State of New York, and of Kew Gardens, in the county of Queens and State of New York, have invented certain new and useful Improvements in Calcium Hypochlorite and Processes of Making Same, of which the following is a specification.

For purifying drinking water and for other purposes, it is desirable to produce calcium hypochlorite of uniform quality as regards active chlorin contents, dryness and insoluble matter. By our invention this desirable result is obtained.

In carrying out our invention, we proceed as follows:

(1) We take about one part (by weight) of fresh calcium hypochlorite manufactured in the usual way. This fresh calcium hypochlorite is excessively dry and dusty, and therefore apt to cause considerable discomfort to persons using it. It has approximately the following composition:—85% hypochlorite, 1% carbonate, 14% chlorid.

(2) We take about one part of calcium hypochlorite also manufactured as usual, and subject it in a tightly closed container, which excludes the atmosphere, to a heat of about 50° C. for a period of say four to five weeks. By this operation, the hypochlorite will gradually give off some of its oxygen, transforming part of the calcium hypochlorite into calcium chlorid, which renders the mass hygroscopic and sticky to an undesirable extent. It has approximately the following composition:—55% hypochlorite, 1% carbonate 44% chlorid.

(3) We take about one part of calcium hypochlorite also manufactured as usual and cause it to stand in an open container in contact with the atmosphere for say one or two weeks. By this operation, the carbon dioxid of the air will act on the calcium hypochlorite, transforming part thereof into calcium carbonate, which renders the mass high in insoluble matter. It has approximately the following composition:—55% hypochlorite, 13% carbonate, 32% chlorid.

(4) The three ingredients above specified are mixed together, are well stirred, and screened, and put up in closed jars or other air tight containers. The resultant product has approximately the following composition:— 65% calcium hypochlorite, 5% calcium carbonate, 30% calcium chlorid, and will contain such a quantity of active chlorin as to be most efficient for the purpose required. It will not dust, is not sticky and contains a properly restricted amount of moisture and insoluble matter.

We claim:

1. Process of making a calcium hypochlorite blend, which consists in mixing a first body of fresh calcium hypochlorite with a second body of calcium hypochlorite partly transformed into calcium chlorid by excluding the atmosphere therefrom for a length of time under the action of heat, and with a third body of calcium hypochlorite partly transformed into calcium carbonate by exposing it for a length of time to the atmosphere.

2. A calcium hypochlorite blend which consists of a mixture of fresh calcium hypochlorite, calcium hypochlorite partly transformed into calcium chlorid, and calcium hypochlorite partly transformed into calcium carbonate.

3. A calcium hypochlorite blend which consists of a mixture of about one part of fresh calcium hypochlorite, about one part of calcium hypochlorite partly transformed into calcium chlorid, and about one part of calcium hypochlorite partly transformed into calcium carbonate.

ALFRED HOFFMAN.
ALFRED H. KROPFF.